United States Patent [19]
Presby

[11] 3,717,942
[45] Feb. 27, 1973

[54] ROTATABLE AMUSEMENT AND EDUCATION DEVICE

[76] Inventor: Benedict F. Presby, 630 Humbolt Street, Brooklyn, N.Y. 11222

[22] Filed: March 16, 1971

[21] Appl. No.: 124,819

[52] U.S. Cl. ................................. 35/77, 40/77.4
[51] Int. Cl. ................................. G09b 1/20
[58] Field of Search .......... 35/28, 31 A, 35 G, 77, 69; 46/37, 35; 40/77.4; 273/155

[56] References Cited

UNITED STATES PATENTS

| 247,302 | 9/1881 | Candy | 35/28 UX |
| 1,584,513 | 5/1926 | Davis | 35/77 |
| 2,461,926 | 2/1949 | Russell | 35/77 |
| 2,931,657 | 4/1960 | Lewis | 35/77 X |
| 3,109,251 | 11/1963 | Krueger | 40/77.4 |
| 3,492,756 | 2/1970 | Stubbmann | 35/77 UX |

FOREIGN PATENTS OR APPLICATIONS

| 422,704 | 1/1935 | Great Britain | 273/155 |

Primary Examiner—Harland S. Skogquist
Attorney—Carl Miller

[57] ABSTRACT

A toy for children for diversion and developing analytic observation, the toy consisting of a series of flat boxes having polygonic side edges, the boxes being stacked one over the other and rotatable about a center longitudinal axis so to selectively align certain of the polygonic side edge faces of the box, each of the faces having a drawing detail, so that when the correct faces are aligned together, the drawing details, together, compose a complete drawing of a person, an object, a word or any other visual design, thus solved by the child.

1 Claim, 3 Drawing Figures

PATENTED FEB 27 1973 3,717,942

INVENTOR
BENEDICT F. PRESBY
BY
Carl Miller
ATTORNEY

ROTATABLE AMUSEMENT AND EDUCATION DEVICE

This invention relates generally to toys for small or young children. More specifically it relates to visual puzzles.

A principle object of the present invention is to provide a visual puzzle toy for younger children particularly and which gives diversion while at the same time teaching the child the values of analytic observation in solving a problem.

Another object is to provide an amusement and educational device which can be played by a child alone or by several children playing together.

Another object is to provide an amusement and education device which can be made in any size and specific shape.

Further objects of the invention will appear as the description proceeds.

To the accomplishment of the above and related objects, my invention may be embodied in the form illustrated in the accompanying drawings, attention being called to the fact, however, that the drawings are illustrative only, and that changes may be made in the specific construction illustrated and described within the scope of the appended claims.

Figure 2:
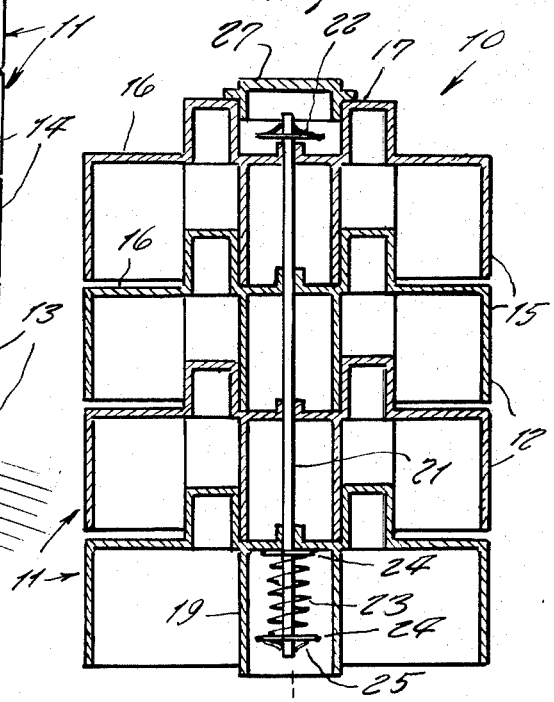
FIG. 2 is a cross section on line 2–2 of FIG. 1.

Referring now to the drawing in detail, the reference numeral 10 represents a rotatable amusement and education device according to the present invention, wherein there are a series of same sized disc-like boxes 11 each of which has a polygonic side edge 12 divided into facets or faces 13, each of the faces having a visual design or drawing detail 14 imprinted thereupon. Each of the boxes may be molded of rigid plastic material so that each comprises a thin shell 15 configurated as shown in FIG. 2, and which in addition to the faces 13 include a top wall 16 upon which this is an upwardly formed a circular rim 17 around a central depression 18 for seating a downward tubular extension 19 formed on an adjacent box. A central opening 20 serves to receive an elongated steel rod 21 that holds the boxes assembled together. A pushnut 22 is fitted on the upper end of the rod, and a compression coil spring 23, washers 24 and pushnut 25 are fitted on the lower end of the rod; the spring providing frictional force so that the boxes will not by themselves freely rotate around the rod and disalign with each other, except when willfully rotated by a child. A plastic cover 27 is decoratively fitted over the uppermost depression 18 for a finished appearance.

Figure 1:
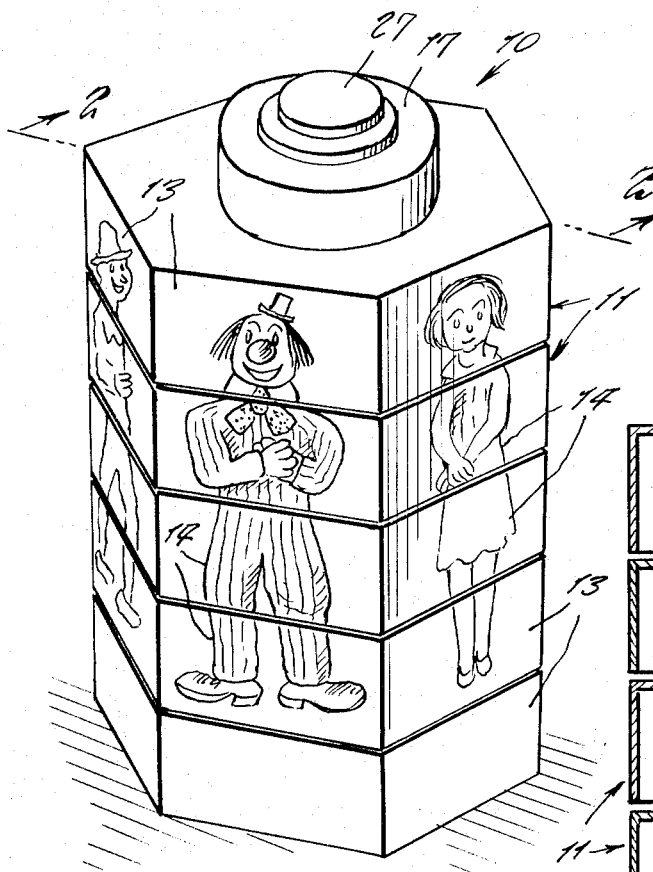
FIG. 1 is a perspective view of one design of the invention.

In operative use, as shown in FIG. 1, the drawing details 14 can be selectively aligned so to form complete pictures 27 which in the case illustrated represent persons. It is noted that the top box shows only heads as the drawing details 14, whereas the other boxes each shows only corresponding portions of persons' bodies so that a child can disalign them to form many numerous combinations of person designs. The bottom box may be left unprinted with designs.

Figure 3:
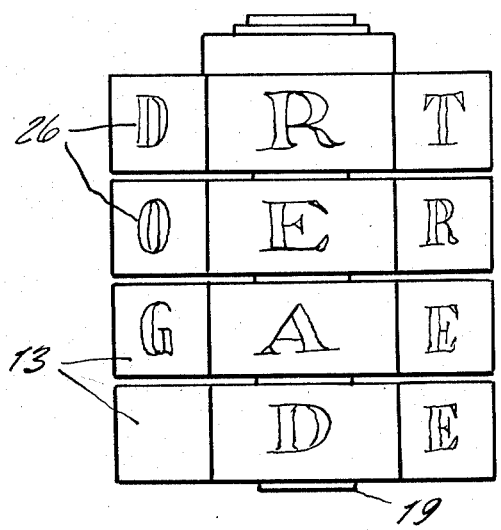
FIG. 3 is a side view of a modified design of the invention.

In FIG. 3, the printed design 14 represents an alphabetic character 26, and a child may align the characters to form vertically extending words as shown in the same Figure.

For very young children the faces may simply only be differently colored so the child can align colors.

As shown in FIG. 2, it is to be noted that the lowermost box 11 is not shown mounted on the rod 21 that holds together all of the boxes above the lowermost box.

While certain novel features of my invention have been shown and described and are pointed out in the annexed claims, it will be understood that various omissions, substitutions, and changes in the forms and details of the device illustrated and in its operation can be made by those skilled in the art without departing from the spirit of the invention.

Having thus described my invention, what I claim as new is:

1. In a rotatable amusement and educational device, the combination of a stack of plastic boxes rotatable individually above a centrally, axially extending rod, each of said boxes having side edges divided into faces which can be aligned with faces of adjacent boxes, said faces each having a visual design thereupon, said designs when aligned thus forming a completed design assembly, said design on each box face comprising either a part of a person's body, an alphabetical letter, or any other design, so to form said design assembly which thus comprises either a complete person's body, a word, or the like, said boxes being held together on said rod with controlled friction by a compression coil spring also fitted on said rod, and said boxes nesting into each other by each box having a downward central tubular extension that is receivable into a central depression of an adjacent box, said central depression being formed by an upward extending circular rim on each box.

* * * * *